Edward C. Luckenbach
William J. Metrailer   Inventors
Charles E. Hemminger
By   L. Chasan   Attorney United States Patent Office 2,874,112
Patented Feb. 17, 1959

2,874,112

HYDROCARBON CONVERSION SYSTEM

Edward C. Luckenbach, Roselle Park, N. J., William Joseph Metrailer, Baton Rouge, La., and Charles E. Hemminger, Westfield, N. J., assignors to Esso Research and Engineering Company, a corporation of Delaware Application May 22, 1957, Serial No. 660,881

11 Claims. (Cl. 208—48)

The present invention relates to a means for the removal of carbonaceous deposits from the walls of a vapor passageway. More particularly, it is concerned with deflaking of coke deposits from the surfaces of a cyclone outlet nozzle leading to a scrubbing unit, such as employed in a fluid coking process, by the application of thermal shock treatment.

Within the past several years, the petroleum industry has developed the fluid coking process for the conversion of heavy hydrocarbon feeds. Briefly described, oil feed is injected into a turbulent bed of reaction solids, normally coke particles, maintained at temperatures of 900 to 1200° F. Although coke particles are preferred, other contact solids having a size range of 0 to 1000 microns, and averaging 40 to 400 microns, such as glass beads, sand, silica, etc. may be alternatively utilized.

Upon contact with the hot solids, the oil is pyrolitically converted to lighter vaporous material and carbon which deposits on the contact solids. Vapors are withdrawn overhead and sent to a solid separation zone, generally a cyclone, wherein entrained solids are removed. Vapors thereafter are passed to a scrubbing or fractionation zone for the recovery of desired components.

Heat for the process is supplied conventionally by circulating contact particles to a burner zone, wherein oxidation of carbonaceous deposits serve to heat them to supply the requisite thermal energy for the conversion step upon their recirculation to the reaction bed.

Typical feeds amenable to fluid bed coking have an initial boiling point above about 700° F., an API gravity of about 0° to 20°, and a Conradson carbon residue content of about 5 to 40 wt. percent.

In the past, considerable difficulty has been encountered in the operation of the cyclone separators employed to remove entrained solids. The vapors, upflowing from the reaction bed, contain heavy hydrocarbon fractions which have a decided tendency to condense on exposed surfaces, thereby depositing carbonaceous residue.

Such deposition of coke materials is particularly odious in the outlet of the solids-separation system. Prior to the removal of solids from the vapor stream, entrained solids serve as a scrubbing medium for scouring deposited materials from exposed surfaces, thus serving as a control on a coke residue buildup. However, the outlet of the separator system is subjected to no such beneficial scouring action.

Additionally, the vapor discharge conduit of the separation zone is of considerably narrower dimensions than the reaction vessel, separation chamber, or other passageway structures through which coker vapors flow. Hence, there is a much greater tendency for carbonaceous deposits to build up to appreciable levels, and interfere with, or completely halt, the normal flow of vapors. Since the conduit normally serves as a vapor inlet to a quench zone, the entrance to which is approximately 200 to 300° F. cooler than the temperature of the reaction bed, there is a decided influence to promote condensation of heavier ends within the passageway, and the consequent laydown of coke material. The entire conversion process may have to be shut down so as to remove these troublesome deposits.

The present invention sets forth a method and apparatus for preventing the accumulation of carbonaceous materials. Briefly stated, the present invention is concerned with a system wherein carbonaceous materials are deflaked from surfaces to which they adhere by the application of thermal shock treatment. Normal surface temperatures are substantially altered, either by heating or cooling, so that the corresponding resultant expansion and contraction serve to spall off carbonaceous solids.

It should be emphasized that the present invention teaches means for limiting or preventing the concentration of deposited residues in the separation zone outlet passageway or scrubber inlet conduit without substantially interfering with the normal flow of vapor materials or the operation of the conversion reaction. Heretofore, conventional means for removing deposited residues had suffered from this serious limitation.

For example, U. S. 2,533,492 by Mekler, teaches that after stopping the normal flow of hydrocarbons, cool air may be blown through tubes used for destructive distillation of organic materials so as to cause shearing of adhering carbon.

The present invention is a distinct step forward in the art by teaching means for periodically or continuously removing carbonaceous deposits without interfering or stopping normal operations.

In order to clarify nomenclature, it should be understood that the term "thermal shock" connotes the appreciable change of temperature, either by cooling or heating, practiced in accordance with the present invention. The phrase "heat exchanging means," is to be interpreted as reading on all heating or cooling devices or methods applicable to effecting such thermal shock.

The various aspects of the present invention will be made more clearly discernible by referring to the following drawings, description, and accompanying examples.

Figures 1, 2, 3:
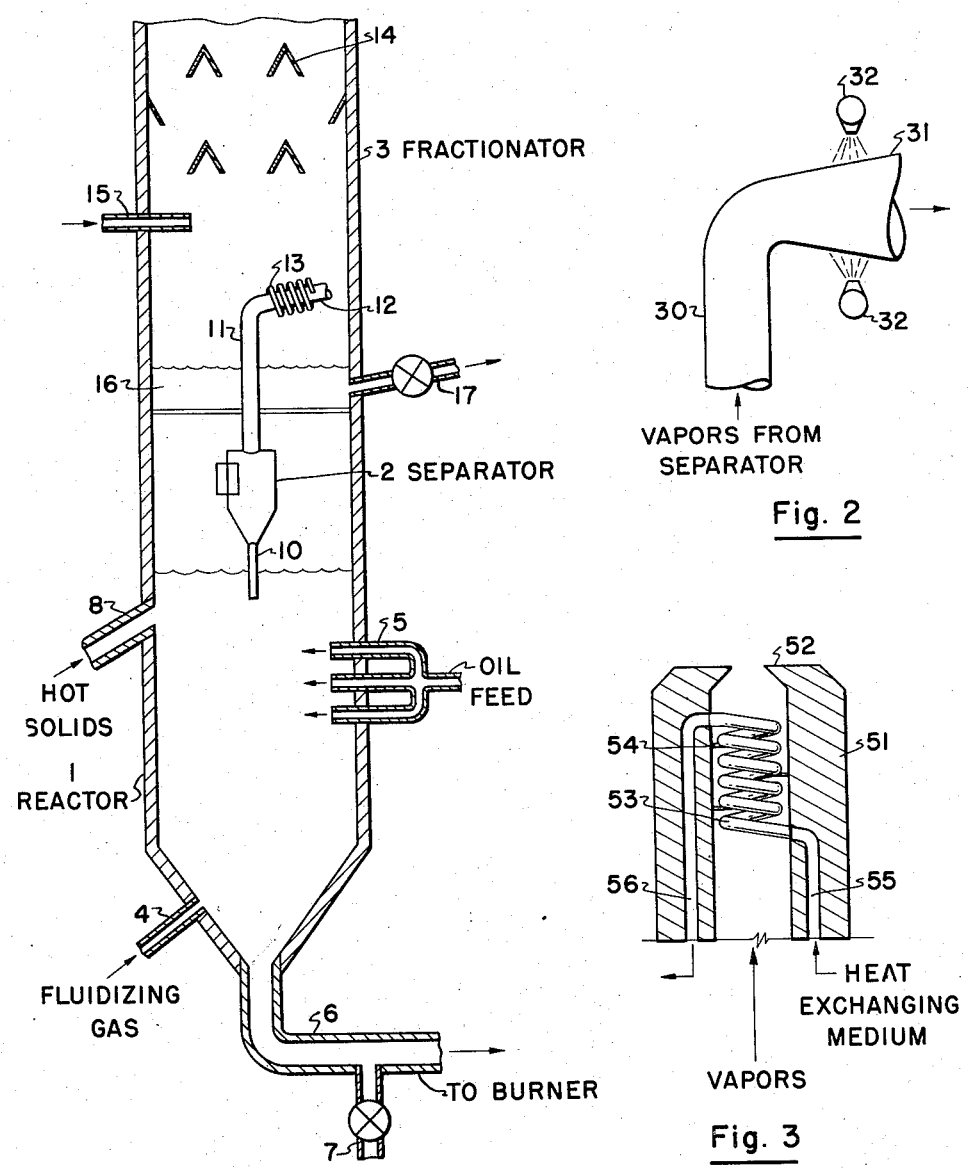
Figure 1 depicts the concept of the present invention as applied to a fluid bed coker and fractionator combination unit.
Figure 2 illustrates a particularly efficacious arrangement of a cyclone outlet spout and means for applying thermal shock.

Figure 3 presents an alternate embodiment of thermally deflaking deposited carbon.

Turning to Figure 1, there is shown a hydrocarbon oil conversion system consisting primarily of reaction vessel 1, solids or separation zone 2, and a superposed fractionating unit 3.

As is conventional, within vessel 1 there is maintained a bed of coke particles at a temperature of 950–1000° F. Gas, such as steam, introduced into the lower portion of the vessel by line 4 serves to fluidize the solids and promote a turbulent particle bed having a density of about 10 to 60 lbs./ft.$^3$, e. g. 40 lbs./ft.$^3$. A portion of the bed particles are continuously removed through line 6 and passed to a heating or burner zone, not shown. Requisite high temperature particles are introduced into the reaction vessel by line 8. A portion of the circulating bed solids may be removed, either continuously or intermittently, by means of line 7, so as to maintain a relatively constant solids mass within the system.

Oil, preheated to a temperature of 700° F., is injected into the solids bed and is thereby converted to vapors and coke which deposits on the bed particles.

Vapors flow upwardly from the reaction bed into separation zone 2, generally located within the reaction vessel. Separation zone 2 may be one or more cyclonic separators, or similar means for removing entrained solids from the vapor stream. Removed solids are passed back to the reaction zone by dipleg 10. Treated vapors are thereafter passed through outlet conduit 11 and thence usually discharged into an overhead fractionation unit 3 containing disc and donut structures 14 or the like, for promoting quenching and rectification of vapors. An oil quench is generally introduced by line 15 so as to cool the liquid in the bottom of the scrubber. Heavier liquid ends accumulate to form holdup pool 16 in the lower part of the fractionator, discharge line 17 being used to remove the heavy liquid for further use as feed or quench material.

Up to this point, the above description of Figure 1 has related to features known to the art. The particular physical inter-relationship of reactor, separator, and fractionator described is not to be construed as limiting in any sense. For example, the present invention has utility in systems wherein a separate, or no distinct fractionation unit, is employed.

As the separated vapors pass through outlet conduit 11 of the separation zone, into fractionator 3, heavy fractions condense on the surfaces of the relatively narrow passageway.

According to the present invention, in order to prevent excessive buildup of carbonaceous material, deposits are thermally flaked off the outlet conduit. The drawing illustrates one embodiment wherein heat exchanging coil 13 is wrapped around the end portion or snout 12 of the conduit.

Periodically as deposits accumulate to higher levels, a thermal shock treatment is applied. Steam, or other heating media, is passed through the coil and heats conduit 13 to 10 to 300° F. above its normal temperature, i. e. a temperature rise resulting in sufficient thermal expansion to cause carbon deflaking. If desired, the heat or expansion treatment may then be followed by a cooling treatment by merely circulating a cooling fluid, such as water or steam, through the heat exchanging coil. The cooling treatment will normally reduce the temperature to 10 to 650° F. below normal operating level.

It should be noted that either the heating or cooling step may be used by itself as a means of thermally deflaking the deposited materials, although it is advantageous to use one or more cycles employing both operations.

The above described embodiment of the present invention is highly desirable in that no extraneous materials are added to the flow of reaction vapors and hence both the flow-rate and composition are substantially unaltered.

While the drawing illustrates the use of a fluid-containing coil, other heat exchanging means such as an electrical heating element, means for utilizing the heat of the contact solids, or of effluent gases from the process should be understood as falling within the scope of the present invention. Further, the present invention may be applied to cyclone outlet structures terminating in an inclined, vertical or horizontal plane, and to configurations wherein the outlet snout is non-tapered, diverged or converged.

Additionally, the present invention may be utilized in separation and/or fractionation units operating in conjunction with catalytic or non-catalytic reactions operated under dense or dilute solids phase conditions.

With reference to Figure 2 there is shown an enlarged view of the outlet of the separation zone, modified in accordance with the present invention.

Hot vapors emanating from the separator pass through conduit 30 and are discharged by means of diverging snout 31. The snout is diverged so as to facilitate the outward flow of removed deposited materials.

Proximately positioned to the walls of the conduit are one or more spray rings 32. Periodically, or continuously if desired, cooling or heating fluids such as water, steam or hydrocarbons are directed against the conduit, thereby substantially altering its temperature and effecting thermal deflaking of adhering carbonaceous residue.

Aside from effecting temperature changes, the addition of steam, water, or the like serves to lower the hydrocarbon partial pressure of the flowing vapors. As will be appreciated by those skilled in the art, subsequent recovery operations are thereby improved.

Turning to Figure 3, illustrated is an additional method of deflaking carbonaceous deposits by the application of thermal shock. A vertical cross section has been taken of the end portion of separation zone discharge conduit 51. While a converging terminal spout 52 is indicated, such a configuration is not essential to this embodiment of the present invention. In the central portion of conduit 51, there is provided a heating coil 53, preferably made of a metal of high thermal expansion. Passageways 55 and 56 serve as means for introducing and removing heating or cooling mediums. Loose mechanical linkage 54 is used to retain coil 53 in place, while maintaining sufficient room to permit expansion and contraction of the coil.

During normal operation the coil would be kept at a sufficiently warm temperature, by utilizing superheated steam or the like, so as to maintain the temperature of upflowing vapors. Any coke deposits which do form are removed periodically by circulating a cooling medium through coil 53. The difference in expansion between the carbon and coil material causes the coke to dislodge.

The following table sets forth a compilation of conditions amenable to the practice of the present invention.

*Table I*

|  | Broad Range | Preferred Range |
|---|---|---|
| Vapor Temperature in Outlet Conduit, ° F | 800–1,500 | 950–1,000 |
| Normal Temperature of Conduit, ° F | 700–1,500 | 850–1,000 |
| Conduit Temperature Change Upon Applying Thermal Shock, ° F.: | | |
| (a) Heat or Expansion Treat., + | 10–300 | 10–150 |
| (b) Cooling or Contraction Treat., − | 10–650 | 10–150 |

In view of the above description, it becomes apparent that the present invention affords important advantages. Accumulation of coke deposition on conduit walls may be kept within tolerable limits. Carbonaceous deposits are readily removed through the application of thermal shock without necessitating the shutdown of the conversion process or substantially affecting its normal operation, as was heretofore required by conventional procedures.

Having described the present invention, what is sought to be claimed is:

1. In a hydrocarbon conversion process wherein a hydrocarbon oil is introduced into a fluidized mass of solids maintained at a reaction temperature, said oil being thus converted to vaporous materials and coke which deposits on said solids, wherein said vaporous materials are passed to a separation zone so as to remove entrained solids, and wherein said vaporous materials are withdrawn from said separation zone, the improvement for removing carbonaceous deposits from the exit passageway of said separation zone which comprises altering the temperature of the surfaces of said passageway which are exposed to contact with said vaporous materials so as to thermally deflake carbonaceous deposits while permitting the continuous flow of vaporous materials to remain substantially unaltered.

2. The improvement of claim 1 wherein said surfaces are subjected to an overall temperature change in the range of 10 to 650° F.

3. The improvement of claim 1 wherein the temperatures of said surfaces are varied without adding extraneous materials to the conversion process.

4. The improvement of claim 1 wherein injection of a fluid against the walls of said passageway serves to effect alteration of surface temperatures.

5. An improved hydrocarbon oil conversion process which comprises the steps of maintaining a fluidized mass of inert solids at a temperature in the range of 900–1200°

F., injecting a suitably preheated hydrocarbon oil into said mass, said oil thus being converted to gasiform materials and coke which deposits on said solids, passing said gasiform material to a solids separation zone wherein entrained solids are removed, withdrawing said gasiform materials from said separation zone through an outlet passageway, and periodically altering the temperature of the surface areas of said passageway so as to thermally deflake deposited carbonaceous materials while permitting the continuous flow of gasiform materials to remain substantially unaltered.

6. An improved apparatus for separating solids from hydrocarbon vapors which comprises inlet means for admitting a stream of hydrocarbon vapors containing entrained solids, solids removal means for de-entraining said solids, outlet means for withdrawing separated vapors, and heat exchanging means in close relation to said outlet means whereby the temperature in the area of said outlet means may be substantially altered to thermally deflake deposited materials while permitting the continuous flow of vapors to be maintained.

7. The improved apparatus of claim 6 wherein said heat exchanging means comprises a coil structure adapted to flow fluids therein, said coil structure encircling the outer surface of said outlet means.

8. The improved apparatus of claim 6 wherein said heat exchanging means comprises an electrical heating element.

9. The improved apparatus of claim 6 wherein said heat exchanging means comprises injection means for directing a fluid against the surfaces of said outlet means.

10. The improved apparatus of claim 6 wherein said outlet means terminates in a diverging snout.

11. Apparatus for converting hydrocarbon which comprises, in combination, a reaction vessel, solids separation means, and a fractionation tower, said tower being in superposed relation to said reaction vessel and said solids separation means being intermediate to said vessel and said tower, passage means for conducting vapors from said reaction vessel to said separation means, means for passing separated vapors to said fractionation tower, heat exchanging means in close relationship to said last mentioned vapor passing means, whereby the temperature in the area of said vapor passing means may be substantially altered to thermally deflake deposited materials while permitting continuous flow of vapors to be maintained.

References Cited in the file of this patent
UNITED STATES PATENTS

| | | |
|---|---|---|
| 2,352,789 | Ibach | July 4, 1944 |
| 2,366,521 | Guichet | Jan. 2, 1945 |
| 2,533,492 | Mekler | Dec. 12, 1950 |
| 2,600,820 | Whatley | June 17, 1952 |
| 2,700,642 | Mattox | Jan. 25, 1955 |